Patented Oct. 8, 1946

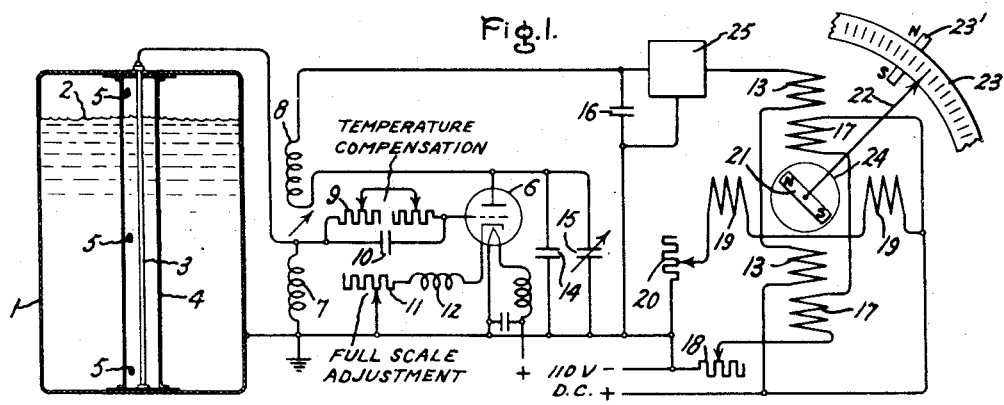
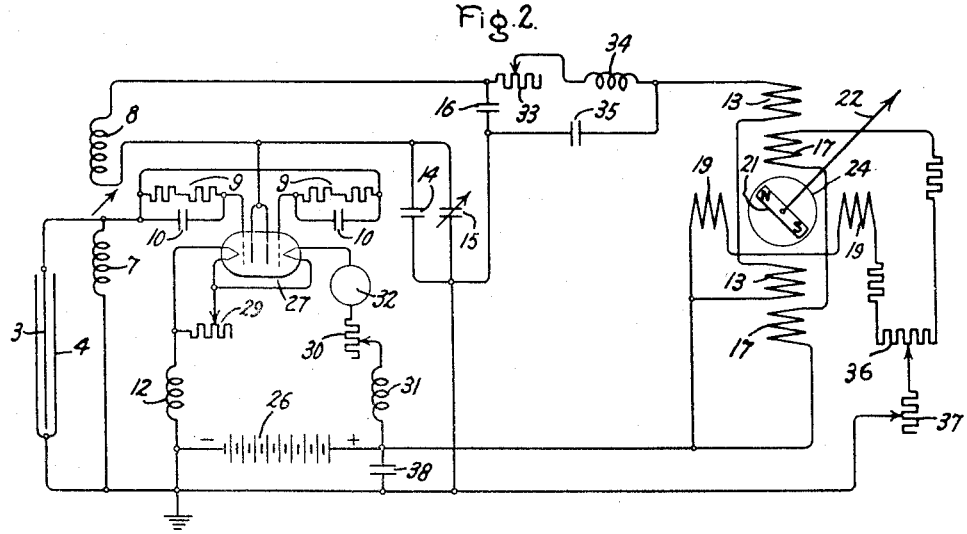
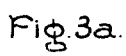
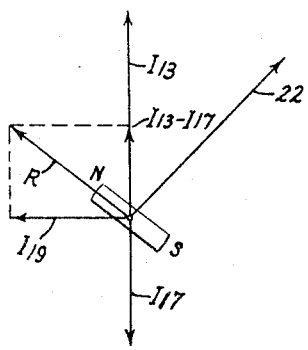
Inventors:
Frederick R. Sias,
Donald B. Pearson,
by Harry E. Dunham
Their Attorney

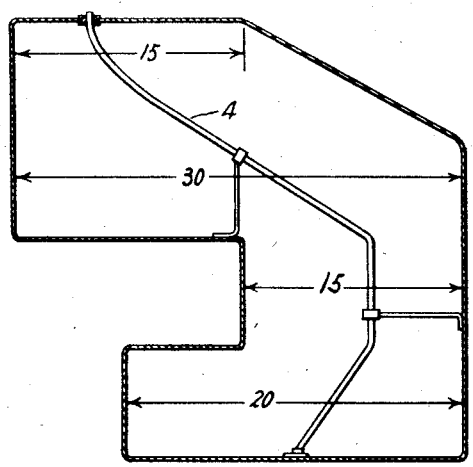
Fig. 4.
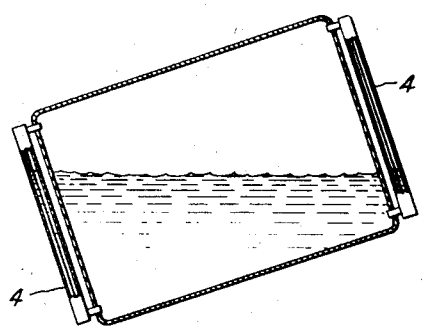
Fig. 5.
Fig. 6.
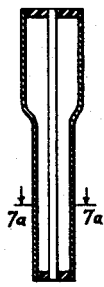
Fig. 7.
Fig. 8.
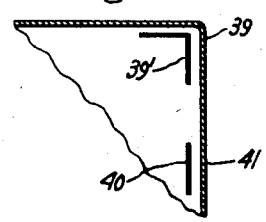
Fig. 9.
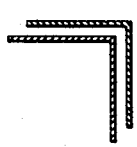
Fig. 7a.
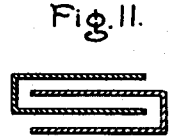
Fig. 10.
Fig. 11.
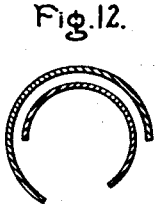
Fig. 12.
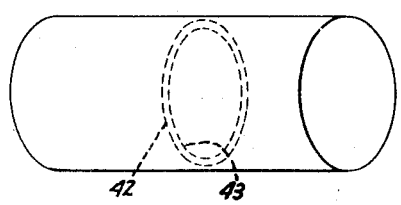
Fig. 13.
Inventors:
Frederick R. Sias,
Donald B. Pearson,
by Harry E. Dunham
Their Attorney.

2,409,073

UNITED STATES PATENT OFFICE 2,409,073

CAPACITOR FUEL GAUGE

Frederick R. Sias, Lynnfield Center, and Donald B. Pearson, Marblehead, Mass., assignors to General Electric Company, a corporation of New York Application March 7, 1945, Serial No. 581,494

6 Claims. (Cl. 177—351)

Our invention relates to improvements in liquid fuel measuring apparatus and is suitable for the remote measuring of the quantity of gasoline in the tanks of aircraft and indicating such quantity in the pilot's compartment. Our invention relates to capacitor type measuring apparatus where the liquid being measured is made the dielectric of a condenser and has a different dielectric constant than that of air such that by the displacement of the liquid fuel by air, the capacitance is changed and measured in terms of liquid quantity. The capacitor type liquid fuel measuring apparatus idea is not new. Such apparatus is disclosed in British Patent No. 441,576 of 1936, for example. Our invention pertains to improvements in such apparatus and in particular to features of the measuring circuit which make good accuracy and reliable apparatus of this type practicable for installation and use on aircraft.

The features of our invention which are believed to be novel and patentable will be pointed out in the claims appended hereto. For a better understanding of our invention, reference is made in the following description to the accompanying drawings in which Fig. 1 shows a preferred form of capacitor gauge measuring circuit suitable for use where a 110-volt source of direct current supply is available. Fig. 2 shows modifications in the circuit as adapted for use where the direct current source of supply is of the order of 27 volts. Figs 3 and 3a are diagrams representing flux relations in the instrument of Fig. 2. Fig. 4 illustrates certain advantages of employing the capacitor type gasoline gauge transmitter where odd-shaped tanks are encountered. Fig. 5 illustrates parallel condensers located outside of a tank which is subject to considerable tipping action. Figs. 6, 7, and 8 show forms of condensers having a varying capacitance over their length. Fig. 7a represents a cross section of the structure of Fig. 7. Fig. 9 illustrates how a tank side or baffle may conveniently be made one of the condenser plates. Figs. 10, 11, and 12 are cross sections of adjustable forms of condensers. Fig. 13 represents a tank with condenser arranged to compensate for tipping errors.

Referring now to Fig. 1, I may represent a gasoline tank filled to a level 2. The tank contains a condenser with its plates extending from top to bottom of the tank. This condenser may take a variety of forms as will hereinafter be explained. In Fig. 1 the plates of the condenser are represented as a central rod or tube 3 extending through a tube 4. These plates are insulated from each other and are made of metal. The outer tube may conveniently be grounded to the metal tank 1. The side wall of tube 4 is perforated at least at the top and bottom as indicated at 5, so that if there is gasoline in the tank, it will fill the tube 4 to the level of the gasoline in the tank as represented. By restricting the extent of such perforations, there is a desirable damping action to the flow of gasoline in and out of the tube, and hence, a more uniform level when the tank is tipped about violently. It is also noted that the condenser is positioned in the center of the tank so that, ordinarily, tipping of the tank will have as small effect as possible upon the length of tubing which is filled with gasoline.

It is evident that the dielectric between the condenser plates constitutes air above the liquid level and gasoline below the liquid level. In the case of gasoline it has approximately twice the dielectric constant of air so that as the gasoline level rises from bottom to top of the tank during filling, the capacitance of the condenser increases by a factor of 2. Hence, we have here a variable condenser, and the means for varying the condenser is the change in level of the gasoline. This change in capacitance may be measured in terms of liquid level or gallons or, more accurately, as we will point out, in weight of the liquid fuel in the tank. Thus there is provided a liquid level measurement transmitter having no moving parts, such as float levers, gearing, electrical contacts, and the like. Also, while the condenser plates are exposed directly to the gasoline, there is no danger of sparks such as would ignite the gasoline. We will explain in connection with Fig. 4 that the condenser may be adjustable independently of changes in dielectric.

The condenser structure may be secured securely in the tank and, in fact, the outer tube may serve also as a strengthening center brace between the top and bottom of the tank and may be welded, bolted, or threaded thereto. The magnitude of the capacitance depends upon the area of the adjacent condenser plate surfaces, their spacing and the dielectric. Hence, the inner plate may be tubing or a rod, and the outer tube may have any desired thickness and outer diameter. Thus the condenser may be made to have whatever mechanical strength and stiffness as are desirable to enable it to withstand bending and other forces to which it may be subjected without restricting the choice of condenser value.

The variable capacitance above described is connected in the input of a vacuum tube oscillator having tuned grid and plate circuits inductively coupled together. The ungrounded plate 3 of the measuring condenser is connected to the grid of the vacuum tube 6, and the grounded plate 4 is connected to the cathode of tube 6. In parallel with the measuring condenser is a coil 7 cooperating with a coil 8 to provide inductive coupling between the plate and grid circuits. This coupling is preferably initially adjustable as indicated by movement of the coils relative to each other. In the grid circuit is a grid leak comprising a resistance 9 in parallel with a condenser 10. In addition to its grid leak function, the resistance 9 is designed with just the proper temperature coefficient of resistance to compensate the circuit for temperature changes as will be explained below. In the cathode circuit are a variable resistance 11 and an inductance 12. The variable resistance 11 is adjustable for the purposes of full scale adjustment. Adjustment of this cathode resistor changes the grid bias of the tube in proportion to the cathode current and permits a full scale measurement current adjustment that does not appreciably affect the current in the measurement circuit at the zero point, as the resistor has little effect when the current through the tube is low. The inductance 12 in the cathode circuit serves as a stabilizer and makes the relation between the measurement capacitance value and plate circuit output more nearly linear. It also assists in making the full scale adjustment independent of zero adjustment.

The output or plate circuit of the tube contains the coils 13 of the direct current receiving instrument, the inductance coil 8, and the 110-volt direct current supply. The plate circuit is tuned by the use of condensers 14 and 15 connected across the inductance coil 8 through the condenser 16. The condenser 15 is adjustable and is used to change the natural frequency of oscillation of the plate circuit for zero scale adjustment. Zero and full scale adjustments are desirable in case it becomes necessary to change the tube at 6. It is seen that both the input and output circuits of the oscillator tube are tuned and that these circuits are coupled together not only by the intercapacity effects of the tube electrodes but also by the inductance coils 7 and 8. After calibration the natural frequency of oscillation of the plate circuit remains fixed and the natural frequency of oscillation of the grid circuit varies with the capacitance of the measurement condenser. Since both circuits are coupled, they oscillate at a resultant intermediate frequency which varies with the amount of gasoline or other dielectric fluid being measured. Assuming a constant voltage supply, the direct current fed to instrument coils 13 changes with frequency, and hence, can be a measure of the fuel in tank 1.

A high degree of stability and low distributed capacity is desirable with respect to the grid and plate circuit elements. Relatively adjustable parts should be so designed and constructed as not to change their adjustment when subjected to vibration and temperature and humidity variations. The condensers 10 and 14 are preferably silver plated, mica condensers so as to have high stability. Shielding of circuits should be used where necessary.

As mentioned above, the resultant frequency of oscillation changes with the fuel level. This results in a change of grid current which is accompanied by a change in D.-C. plate current. The plate current is used to operate a ratio type direct current instrument. A ratio type instrument is desirable to minimize errors due to changes in supply voltage.

The indicator has three separate windings; one winding 13 supplied from the oscillator is in the same axis as a winding 17 connected across the direct current supply through an adjustable calibrating resistor 18. The windings 13 and 17 are connected in bucking relation. The reason for this is that when the tank 1 is empty, the direct current from the plate circuit of the tube is not zero. By the use of the bucking winding 17, the empty tank condition current in winding 13 can be bucked out and a longer indicator scale obtained. The third winding 19 also connected across the direct current supply through a calibrating resistor 20 has its flux axis 90 degrees from the axis of windings 13 and 17 and provides the controlling torque of the instrument in much the same way as a control spring does for a D'Arsonval instrument. The instrument thus has no control spring. The armature consists of a lightweight polarized magnet 21. The armature may be bar-shaped or may comprise a cylindrical magnet polarized across a diameter. The pivoted armature carries a pointer 22 cooperating with a stationary scale 23. The circle 24 surrounding the armature represents a damping conductor. Structurally this instrument is quite similar to that shown and described in United States Patent No. 2,354,555, July 25, 1944.

By adjusting the resistor 18 in series with the bucking winding 17, the midpoint of the scale may be made to correspond to an armature position in line with the axis of winding 19. The resistance 20 in series with the winding 19 may then be adjusted to expand or contract the scale. Increasing the torque produced by winding 19 decreases the scale length. Thus the indicator is provided with a center scale adjustment and a scale length adjustment. A scale length of approximately 110 degrees is feasible. The instrument as thus designed and connected is largely compensated for voltage changes.

What little voltage error remains is greatest at full scale and may be further reduced by the use of a pull-off magnet which opposes the voltage error and has its greatest torque in the full scale position. Thus at 23' we have shown a small permanent magnet suitably fixed to some stationary part of the instrument and positioned to cooperate with the permanent magnet armature 21 to rotate the latter to a position where the pointer 22 is off scale in case the power supply to the instrument fails, thus preventing a false indication and giving warning of such failure. The pull-off magnet of course has some small torque effect on the armature when the instrument is energized, and this torque effect has greatest control when the instrument voltage is low and when the pointer is near the up-scale end of its deflection range. Hence, the pull-off magnet in addition to its usual function is used to still further reduce the voltage error of the instrument. The instrument as thus constructed and used has a voltage error of less than 1% for supply voltage variations of 20%.

It was found that when reading mass of fuel without temperature compensation and when using low temperature coefficient resistors, the system had a positive temperature error; that is, the receiver instrument reading was high at high temperatures and low at low temperatures. This is an over-all temperature error and is probably the resultant of a plurality of temperature errors in various parts of the system. It was further found that this could be reduced to a negligible value by selecting a resistor 9 in the grid leak of the oscillator tube which had the proper temperature coefficient of resistance, which was not necessarily the same for different installations, tubes, etc.

If the resistor at 9 is all copper, the system will generally have a temperature error opposite to that mentioned above. We have found that the temperature coefficient of resistance of the resistance at 9 should be reduced toward a zero value, and that the desired results can be arrived at by using a resistor partially of copper and partially of a material having a zero or negligible temperature coefficient connected in series, and adjusting the relative values of each until compensation for the average conditions encountered is obtained. In general, the temperature coefficient to be used here was found to be nearer zero than that of copper but that it varied somewhat with different systems.

Without intending to confine our invention to any particular values of circuit constants employed, it may be stated that the following may be employed together to give satisfactory results. Use a variable measurement condenser in the tank 1 having a capacitance of 150 m. m. f. with tank empty and 300 m. m. f. with tank full.

| | | |
|---|---|---|
| Condenser 10 | m. m. f. | 400 |
| Condenser 14 | m. m. f. | 250 |
| Condenser 15 | m. m. f. | 4 to 30 |
| Condenser 16 | m. f. | .01 |
| Resistance 9 | ohms | 14,500 |
| Coil 7 | turns | 200 |
| Coil 8 | do | 200 |
| Coupling spacing between coils 7 and 8 without iron core | inches | 0.2 |
| Coil 12 | microhenrys | 200 |

Frequency range—240 kilocycles tank full to 280 kilocycles tank empty.

In calibrating the apparatus, the zero adjustment with condenser 15 should be made first. Thus with the tank empty, adjust condenser 15 to cause pointer 22 to read zero on the scale. Now with the tank full, adjust 11 until the pointer 22 reads at the full scale point of the scale. The reason for this order of procedure is because the full scale measurement current adjustment with resistance 11 does not affect the zero scale reading, whereas this zero scale adjustment does influence the full scale reading. These adjustments should be made in conjunction with the scale distribution adjustments with resistances 18 and 20.

While the apparatus may be calibrated in gallons or inches of fuel in the tank, there is some advantage in calibration in terms of weight of fuel because essentially that is what is measured and the calibration will not change appreciably with different grades of gasoline or fuel in the tank. It was found that the dielectric constant of different grades of gasoline is substantially proportional to the gasoline density. Hence, if calibrated in pounds or mass of fuel, changes in the grade of gasoline used and changes in the temperature of the gasoline with corresponding changes in density will have little effect upon the calibration and, in general, such calibration will be closer to the actual fuel value of the gasoline used than if made on a volume basis.

In order to minimize radio interference, it is desirable to segregate the oscillator circuit by a suitable filter or filters which will substantially prevent undesirable frequency pulsations from passing in either direction therethrough. Such a filter is represented at 25 in Fig. 1.

Fig. 2 shows the capacitor type gasoline gauge circuit adapted for use on a 24-volt direct current source of supply 26. Parts similar to those of Fig. 1 are designated by like reference characters. In this case we find it desirable to employ a double triode 27 as the vacuum tube unit of the oscillator. The two plates of the tube are connected in parallel to one side of inductance coil 8. Temperature compensating grid leak resistors of the same type as used in Fig. 1 are provided in the grid circuits, and the grid circuits are connected in parallel beyond the grid leaks to the ungrounded plate 3 of the variable measurement condenser and to one side of inductance coil 7. Separate grid leak resistors of equal value produce better operation than does a single grid leak for both grids. The resistances used in these grid leaks may vary over a considerable range. A resistance value of 4000 ohms is very satisfactory. The zero scale measurement current adjustment is the same as in Fig. 1 by means of the condenser 15.

In Fig. 2 the cathodes are connected in series across the source of supply 26 and it is not easily possible with this type of tube to provide full load adjustment by means of a cathode resistor, as this would change the cathode filament voltage and temperature. Provision is made as by an adjustable resistance 29 in shunt to one filament for obtaining a proper balance between the two cathode heating currents, and the heater current of both may be adjusted by a variable resistance 30 in series. The series reactance at 31 in conjunction with condenser 38 provides filtering action, and at 32 we provide an iron filament ballast lamp in the cathode heater circuit to compensate for variations in the voltage of the supply source. This is important where the voltage of the source 26 varies, since without it the apparatus has an appreciable voltage error. With the lamp at 32 the voltage source may vary from 22.5 to 29.5, with a practically constant cathode filament voltage and operation within acceptable voltage error limits over the entire load range.

Full scale measurement current adjustment is provided for by an adjustable resistor 33 in the plate circuit of the electronic oscillator leading to the measuring instrument. While in Fig. 1 the full scale current adjustment resistor 11 might be placed at any point in the tube instrument circuit, in Fig. 2 it may not readily be placed between the cathode and source of supply, because then it would influence the heating current of the cathode filaments. An inductance 12 may be desirable to improve stability. Also, in the plate circuit, Fig. 2, is a filtering connection comprising an inductance 34 and a condenser 35 which assists in screening the alternating current of the oscillator from the instrument circuit.

The instrument used is the same as in Fig. 1, although a somewhat different arrangement for adjusting the length of scale distribution is provided. In Fig. 2 the potentiometer 36 adjusts the relative values of bucking field current in winding 17 and the cross field current in winding 19, while the potentiometer 37 is in series with both of these fields.

In Fig. 3 let the vector $I_{19}$ represent the magnitude and direction of the field of winding 19 of such polarity as to tend to pull the N pole of the polarized rotor 21 in a corresponding direction. Then vector $I_{17}$ correspondingly represents the bucking field of winding 17 and $I_{13}$ the field of measurement winding 13. The resultant of the opposed fields $I_{17}$ and $I_{13}$ is their difference, or $I_{17}$—$I_{13}$, and the resultant of all of the fields acting on the armature is R. This generally represents the conditions when the measurement current $I_{13}$ is low and the pointer 22 is near the zero or low end of the scale.

It will now be evident that under such conditions when $I_{17}$ is greater than $I_{13}$, moving the slider of potentiometer 36 to the right will decrease $I_{19}$ and increase $I_{17}$, and $I_{17}$—$I_{13}$, and move the pointer to a lower point of the scale. Moving the slider of potentiometer 37 upward will increase both $I_{19}$ and $I_{17}$, and also $I_{17}$—$I_{13}$, since $I_{13}$ stays constant. While this will increase R, it will have a negligible effect on its vector direction and the position of the pointer 22. On the other hand, when $I_{13}$ is large with respect to $I_{17}$ corresponding to the conditions represented in Fig. 3a, when the pointer 22 is near the upper end of the scale, moving slider of 36 to the right decreases $I_{13}$—$I_{17}$ and $I_{19}$, and if the proportions are properly selected, will have a negligible effect on the direction of R, and the pointer position. Moving slider of 37 upward will increase $I_{19}$ and $I_{17}$ and decrease $I_{13}$—$I_{17}$ for the conditions represented in Fig. 3a, which will move the pointer 22 to a lower point on the scale. Thus potentiometer 36 may be used for adjusting the zero end of the scale with negligible effect upon the upper scale distribution, and potentiometer 37 may be used for adjusting the full end of the scale with negligible effect on the down-scale distribution.

This type of zero and full scale adjustment may of course be used in Fig. 1 and is the preferable arrangement in this respect. The other resistances in the circuits of windings 17 and 19 of Fig. 2 are voltage dropping resistors and may or may not be needed. In case the current through any of the windings is too large in proportion to the current through other windings of the instrument, the excessive current may of course be shunted by a suitable resistor.

In any case where it is difficult or undesirable for any reason to mount the measurement condenser or condensers within the tank, it or they may be mounted outside as represented in Fig. 5. Here a pair of tubular condensers are mounted at opposite ends of a tank at the centers thereof and connected thereto by conduits at top and bottom so that any liquid in the adjacent end of the tank will flow into the condensers at the same level. If the two condensers are connected in parallel in the input circuit of the oscillator, the parallel capacitance will correspond to the amount of fluid in the tank even though the tank tips as represented, or at right angles to that illustrated.

In Fig. 4 we have represented an odd-shaped tank in cross section. To simplify the illustration, the tank is assumed to have a uniform dimension in the direction perpendicular to the plane of the drawings and to have four equal height sections of different lateral dimensions or shapes in the plane of the drawings, such relative latter dimensions being marked thereon. A tubular condenser 4 of uniform cross-sectional dimensions may be mounted in the tank from top to bottom, as represented, and give a capacitance variation which is linearly proportional to the amount of fluid in the tank in spite of the fact that the dimensions and cross-sectional capacity of the tank differ materially from top to bottom. This is accomplished by simply changing the scope or inclination of the tubular condenser from the vertical in proportion to the increase in tank area from point to point. At the smallest cross-sectional area with the lateral dimension 15, which may be referred to as the unit area, the tubular condenser may be vertical. Where the area is doubled at the dimension 38, the slope of the condenser is then made such that it has double the length in rising a corresponding distance. Through the lower section having the dimension 20 and 4/3 the unit area, the condenser is sloped to have a length of 4/3 of that through the unit area section.

Through the upper section which has a uniformly increasing area from top to bottom with the top dimension 15 and the bottom dimension 38, the tubular condenser is curved and has an inclination varying from the vertical at the top to that corresponding to the double unit area at the bottom of this tank section, such that its length per unit of rise is in the same proportion to the cross-sectional area of the tank at all points. It is further noted that the condenser is positioned centrally of the tank so that if the tank tips, the level of the liquid being measured in the condenser will closely approximate that corresponding to a level tank condition. The tubular condenser will of course have openings to the tank at least at top and bottom, and will be suitably braced in place and between its insulated plates to remain in accurate working condition.

In Fig. 13, we have represented a tank with any desired shape of cross section, here represented as circular, having a baffle plate 42 through its center which will be metallic and secured to the tank wall. Positioned closely thereto but insulated from the tank and baffle, is a metallic plate 43. Forty-two (42) and 43 form the plates of the tank condenser and correspond to plates 4 and 3 of Fig. 1. This arrangement will correctly measure the liquid in the tank for reasonable angles of tilt in any direction from the position shown.

Figs. 6, 7, and 8 show different forms of tubular condensers having a varying capacity over their lengths. In each case the capacity per unit length increases from top to bottom; in Fig. 6 substantially uniformly; in Fig. 8 abruptly in a step; and in Fig. 7 in a gradual step. The capacitance increases as the dimension between condenser plates decreases. It is apparent that with the form of condenser of Fig. 7 the outer pipe plate can be flattened as indicated in Fig. 7a to vary the capacitance as desired within limits after the condenser is installed.

In Fig. 9 we have represented cross-sectional views of condenser plates $39_1$ and 39 where $39_1$ is a piece of angle metal and 39 one corner of the tank or a baffle in the tank. At 40 and 41 flat plates are represented, one being a baffle and a wall of the tank.

Figs. 10 and 11 represent forms of condensers which may be varied as a whole or from end to end by changes in the separation of the plates. Fig. 12 represents a variable condenser comprising two slit tubular portions one within the other. The condenser as a whole can be accurately adjusted by turning one tubular part on its axis, while the condenser may be varied from end to end by an eccentricity adjustment. It is understood that in Figs. 6 to 13, inclusive, the dielectric used is a combination of liquid to be measured and air, as explained in connection with Fig. 1.

It will be observed that with a measurement condenser like that shown in Fig. 1 or 4, for example, the outer tube of the condenser is in effect a miniature tank as well as a condenser plate, so that if such condenser were included as a part of a pipe line at any convenient point, one could tell by observing the measuring instrument whether the pipe line contained liquid or not.

The apparatus can also be used as a pressure indicator by the simple expedient of forcing a dielectric liquid up in a tubular condenser structure in respect to pressure instead of liquid level and calibrating the measuring instrument accordingly.

What we claim as new and desire to secure by Letters Patent of the United States is:

1. An oscillation circuit measuring system comprising a vacuum tube having cathode, control grid and plate electrodes, a tuned input circuit connected between the cathode and grid containing a variable measurement condenser, a tuned output circuit including a direct current source of supply connected between the cathode and plate, said tuned circuits including a coil connected across the input circuit and a coil connected in the output circuit for coupling said circuits, a measuring instrument responsive to changes in current in the output circuit caused by variations of the measurement condenser in the input circuit, variable resistance means in the output circuit for obtaining full scale instrument adjustment, variable capacitance connected across the coil in the output circuit for varying the tuning of such circuit and obtaining zero scale instrument adjustment, and a grid leak in the grid connection of said vacuum tube including resistance having a temperature coefficient of resistance selected to compensate said measuring system for temperature errors.

2. An oscillation type measuring system comprising a vacuum tube having cathode, control grid and plate electrodes, a tuned input circuit connected between the cathode and grid and including a variable measurement condenser for determining the tuning of the input circuit, a tuned output circuit containing a source of direct current supply connected between the cathode and plate, said tuned circuits including a coil connected across the input circuit and a coil connected in the output circuit for coupling said circuits, a ratio type measuring instrument having a winding energized from said source and a winding energized from said output circuit and responding to variations in the capacitance of the measurement condenser, variable resistance means in the output circuit for obtaining full scale instrument adjustment, variable capacitance connected across the coil in the output circuit for varying the tuning of the output circuit and obtaining zero scale instrument adjustment, filtering means segregating the measuring instrument and oscillator circuits and inductance in the cathode connection of said tube for obtaining stable operation of said measuring system.

3. An oscillation type measuring system comprising a vacuum tube having cathode, control grid and plate electrodes, an input circuit between cathode and grid including a variable measurement condenser by means of which said circuit is tuned, an output circuit including a direct current source of supply connected between the cathode and plate, an inductive coupling between the input and output circuits, means for tuning the output circuit, a ratio type of measuring instrument having a winding supplied from said source and a winding supplied from said output circuit so as to respond to variations in the measurement condenser with minimum disturbance caused by variations in the voltage of said source of supply, a grid leak for said vacuum tube containing a resistance having a temperature coefficient of resistance selected to compensate for the over-all temperature errors of said measuring system, inductance included in the cathode connection of said tube for stabilizing the operation of said system, and filtering means for segregating the oscillation and measuring instrument circuits.

4. An oscillation type measuring system comprising a vacuum tube having cathode, control grid and plate electrodes, a variable measurement condenser connected in a tuned input circuit between the cathode and grid, an output circuit containing a direct current source of supply connected between the cathode and plate, means for inductively coupling said input and output circuits, a ratio type measuring instrument having bucking windings in one axis, one winding being supplied from said source and the other from said output circuit, a winding in an axis at right angles to the bucking windings also supplied from said source, said instrument responding to changes in the current in the output circuit caused by changes in the capacitance of said measurement condenser, means for tuning the output circuit for zero scale adjustment of said instrument, resistance in the output circuit for full scale adjustment of said instrument, and means for varying the current in both of the measuring instrument windings which are supplied from said source, relative to each other and relative to the current in the winding supplied from the output circuit.

5. An oscillation type measuring system comprising a vacuum tube having double cathode, control grid and plate electrodes, an input circuit having parallel connections to the cathodes and grids, said input circuit containing a variable measurement condenser which controls the tuning of such input circuit, an output circuit containing a direct current source of supply having parallel connections to the cathodes and plates said direct current source of supply being connected in series between said cathodes, a ballast lamp in said series connection, means for inductively coupling said input and output circuits, a ratio type direct current measuring instrument having bucking windings in one axis and a third winding in a quadrature axis serving the purpose of a zero return spring, one of said bucking windings being supplied from said output circuit and the other two windings from said source of supply, said instrument being responsive to the current in said output circuit in response to variations in tuning of the input circuit, a variable resistance in the output circuit for full scale instrument adjustment, adjustable capacitance for tuning the output circuit to obtain zero scale instrument adjustment, a potentiometer connection between the source of supply and the two instrument windings supplied therefrom whereby the relative magnitudes of the currents in these windings may be adjusted, and an adjustable resistance in series with both of the last-mentioned windings whereby their currents may be varied relative to the current in the winding supplied from the output circuit.

6. An oscillation circuit measuring system comprising vacuum tube means having cathode, control grid, and plate electrodes, a tuned input circuit connected between a cathode and a grid of said vacuum tube means and containing a variable measurement condenser, a tuned output circuit including a direct current source of supply connected between a cathode and a plate of said vacuum tube means, said tuned circuits including a coil connected across said input circuit and a coil connected in said output circuit for coupling said circuits, a measuring instrument responsive to changes in current in said output circuit caused by variations of the measurement condenser in said input circuit, variable resistance means in said output circuit for obtaining full scale instrument adjustment, variable capacitance connected across the coil in said output circuit for varying the tuning of such circuit and obtaining zero scale instrument adjustment, and a grid leak in the grid electrode connection of said input circuit including a resistance having a temperature coefficient of resistance selected to minimize temperature errors in said measuring system.

FREDERICK R. SIAS.
DONALD B. PEARSON.